United States Patent
Tanabe

(10) Patent No.: US 7,631,565 B2
(45) Date of Patent: Dec. 15, 2009

(54) COLLISION DETECTION SYSTEM

(75) Inventor: Takatoshi Tanabe, Ichinomiya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/974,898

(22) Filed: Oct. 16, 2007

(65) Prior Publication Data
US 2008/0098821 A1 May 1, 2008

(30) Foreign Application Priority Data
Oct. 26, 2006 (JP) ............... 2006-291121

(51) Int. Cl.
G01L 1/22 (2006.01)
G01D 7/00 (2006.01)
B60T 7/22 (2006.01)

(52) U.S. Cl. ............... 73/862.474; 73/862.041; 180/274; 701/45

(58) Field of Classification Search ............ 73/775, 73/862.041–862.046, 862.621, 862.627; 701/45; 180/274; 702/127; 280/703.1–730.2, 280/734–735; 340/436
See application file for complete search history.

(56) References Cited

U.S. PATENT DOCUMENTS

| | | | |
|---|---|---|---|
| 6,212,456 B1 | 4/2001 | Stride | |
| 6,929,282 B1 * | 8/2005 | Zoratti et al. ............... | 280/735 |
| 6,997,060 B2 | 2/2006 | Morikawa | |
| 7,308,380 B2 * | 12/2007 | Tanabe ................ | 702/41 |
| 7,424,179 B2 * | 9/2008 | Ohtaka et al. ............... | 340/436 |
| 2005/0021192 A1 * | 1/2005 | Takafuji et al. ............... | 701/1 |
| 2006/0100763 A1 * | 5/2006 | Tanabe ................ | 701/45 |
| 2006/0103514 A1 * | 5/2006 | Hosokawa ................ | 340/436 |
| 2006/0150752 A1 * | 7/2006 | Lorenz et al. .......... | 73/862.046 |
| 2006/0185922 A1 | 8/2006 | Tanabe | |
| 2006/0185923 A1 | 8/2006 | Tanabe | |
| 2006/0224289 A1 * | 10/2006 | Kiribayashi et al. ........... | 701/45 |
| 2007/0115104 A1 * | 5/2007 | Suzuki et al. ............... | 340/436 |
| 2007/0132565 A1 | 6/2007 | Tanabe | |

(Continued)

FOREIGN PATENT DOCUMENTS

WO  WO 2006046771 A1 * 5/2006

(Continued)

OTHER PUBLICATIONS

Office Action dated Jul. 7, 2008 in German Application No. 10 2007 048 988.0 with English translation thereof.

*Primary Examiner*—Lisa M Caputo
*Assistant Examiner*—Jonathan Dunlap
(74) *Attorney, Agent, or Firm*—Harness, Dickey & Pierce, PLC

(57) ABSTRACT

A collision detection system for a vehicle includes a bumper reinforcement fixed to a side member of the vehicle, a pressure sensor placed in front of the bumper reinforcement and having at least one pressure-sensitive member, and a load plate placed in front of the pressure sensor. The load plate has a base member and at least one leg member extending from the base member toward the bumper reinforcement. The base member has a first portion facing the pressure sensitive member of the pressure sensor and a second portion fixed to the leg member. The pressure sensor can have a small pressure-sensitive range, because the leg member reduces pressure applied through the load plate to the pressure sensor.

3 Claims, 5 Drawing Sheets

U.S. PATENT DOCUMENTS

2007/0164574 A1    7/2007  Tanabe
2008/0060450 A1*   3/2008  Bischoff et al. ........ 73/862.041
2008/0122599 A1*   5/2008  Suzuki et al. ................ 340/436
2008/0202251 A1*   8/2008  Serban et al. ................. 73/780

FOREIGN PATENT DOCUMENTS

WO    WO 2006107001 A1 *  10/2006

* cited by examiner

VEHICLE →

COLLISION DETECTION SYSTEM

CROSS-REFERENCE TO RELATED APPLICATION

This application is based on and incorporates herein by reference Japanese Patent Application No. 2006-291121 filed on Oct. 26, 2006.

FIELD OF THE INVENTION

The present invention relates to collision detection systems for a vehicle, and in particular, to a collision detection system that detects a collision of an object with a bumper of the vehicle.

BACKGROUND OF THE INVENTION

Safety for occupants of a vehicle involved in an accident has been improved. Recently, in addition to occupant safety, pedestrian safety has been required to protect pedestrians from fatal injuries in the accident. Therefore, it becomes important to detect a collision of the vehicle with the pedestrians.

A collision detection system has been proposed that detects a collision of a vehicle with an object by a pressure sensor installed between a bumper absorber and a bumper reinforcement of the vehicle. A load plate made of resin or metal is interposed between the bumper absorber and the pressure sensor.

In such a collision detection system, a mat-type pressure-sensitive sensor is sometimes used as the pressure sensor. When used as the pressure sensor of the collision detection system, the mat-type pressure-sensitive sensor needs to have a large pressure-sensitive range to sense high pressure.

However, whereas a mat-type pressure-sensitive sensor having a small pressure-sensitive range is cheap, a mat-type pressure-sensitive sensor having a large pressure-sensitive range is costly. Further, a mat-type pressure-sensitive sensor is partially made of resin, and the resin portion is deformed when receiving high pressure. The resin portion may remain deformed even after the high pressure is removed. As a result, the mat-type pressure-sensitive sensor may—not return to its original shape and may produce inaccurate output.

SUMMARY OF THE INVENTION

In view of the above-described problem, it is an object of the present invention to provide a collision detection system that detects a collision of a vehicle with an object by a pressure sensor having a small pressure-sensitive range.

A collision detection system for a vehicle includes a bumper reinforcement fixed to a side member of the vehicle, a pressure sensor placed in front of the bumper reinforcement and having at least one pressure-sensitive member, and a load plate placed in front of the pressure sensor.

The load plate has a base member and at least one leg member extending from the base member toward the bumper reinforcement. The base member has a first portion facing the pressure sensitive member of the pressure sensor and a second portion fixed to the leg member. The pressure sensor can have a small pressure-sensitive range, because the leg member reduces pressure applied through the load plate to the pressure sensor.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

First Embodiment

Figure 1:
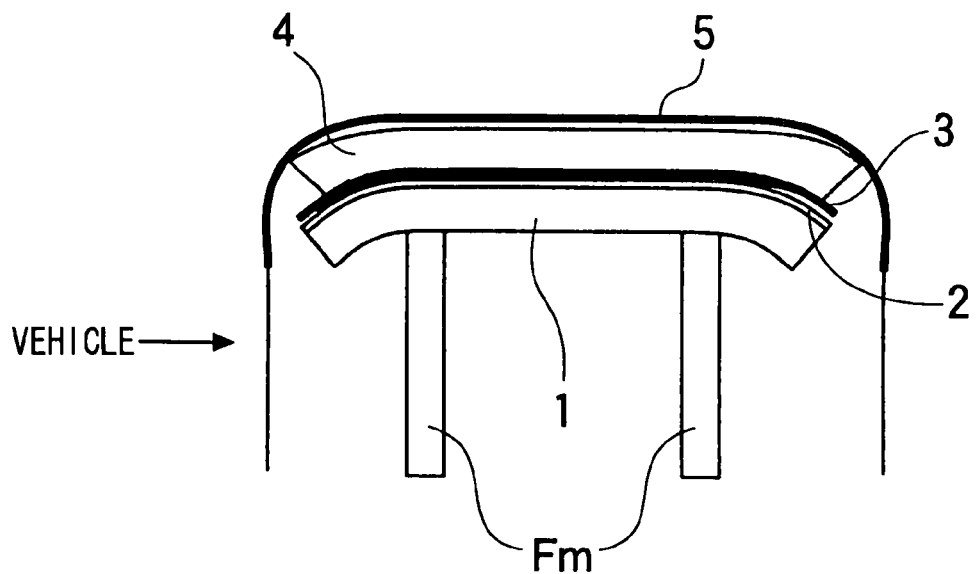
FIG. 1 is a top view of a collision detection system according to a first embodiment of the present invention.

Referring to FIGS. 1-5B, a collision detection system according to a first embodiment of the present invention includes a bumper reinforcement 1, a pressure sensor 2, a load plate 3, a bumper absorber 4, a bumper cover 5, and a calculation circuit (not shown).

The bumper reinforcement 1 is made of a metal. The bumper reinforcement 1 is located on the front of a vehicle and extends in a side-to-side direction of the vehicle. A back surface of the bumper reinforcement 1 is fixed to a front side member (Fm) of the vehicle.

Figure 2:
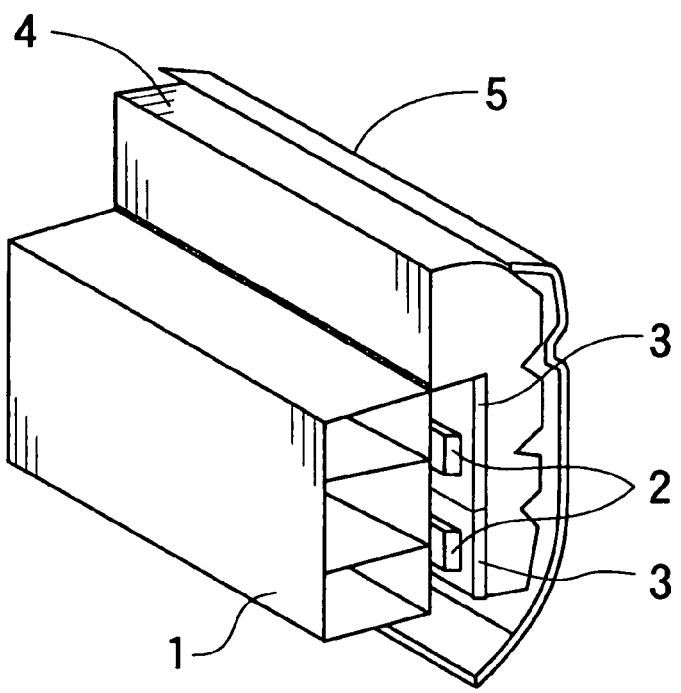
FIG. 2 is a perspective view of the collision detection system of FIG. 1.

The pressure sensor 2 is a mat-type pressure sensitive sensor and placed on a front surface of the bumper reinforcement 1. As shown in FIG. 1, the pressure sensor 2 has a shape like a strip and extends along the bumper reinforcement 1. In this embodiment, as shown in FIG. 2, the collision detection system includes two pressure sensors 2 that are vertically aligned with each other.

Figure 5A:
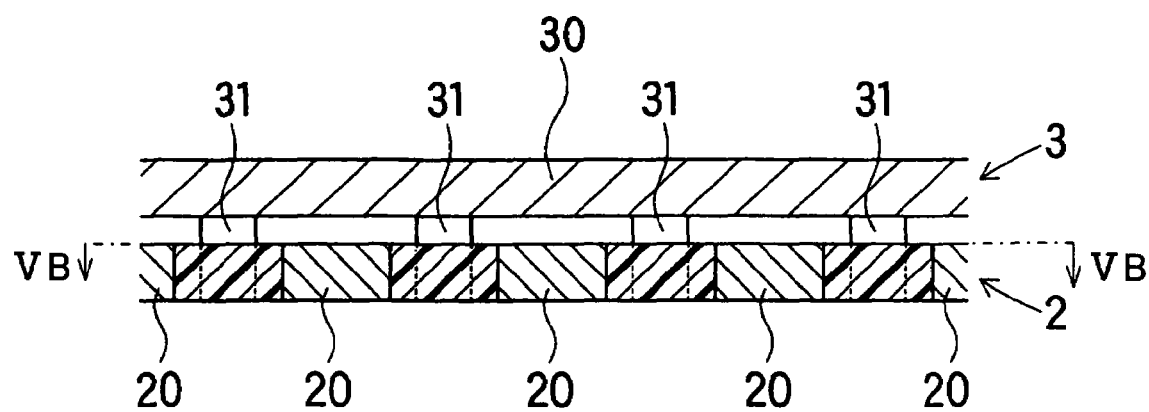
FIG. 5A is a cross-sectional view showing a positional relationship between the pressure sensor of FIG. 3 and a load plate of the collision detection system of FIG. 1.
Figure 5B:
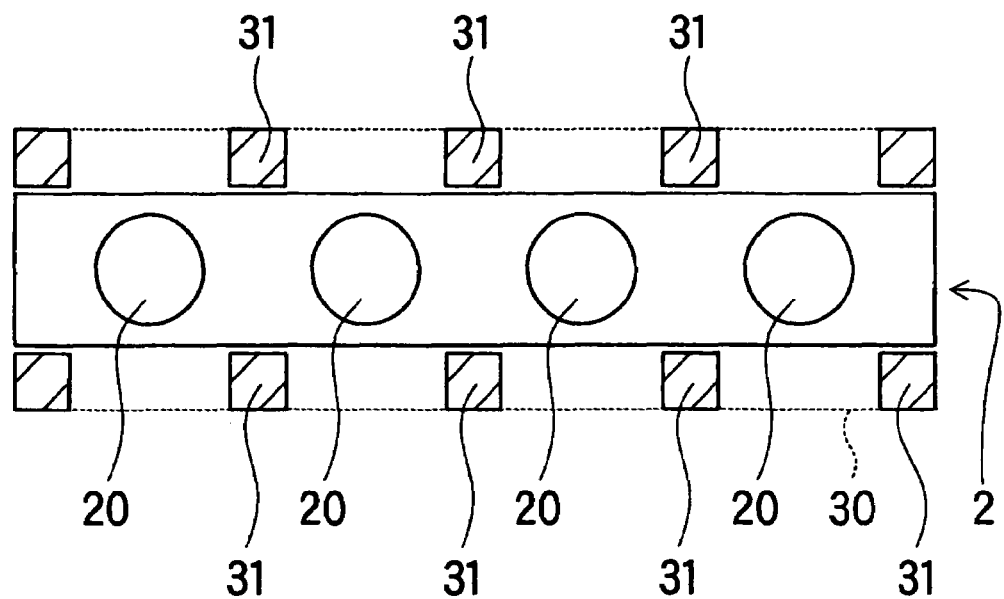
FIG. 5B is a cross sectional view taken along line VB-VB of FIG. 5A.

As shown in FIGS. 5A and 5B, the pressure sensor 2 includes a plurality of sensor cells 20 that are arranged in a line along the length of the pressure sensor 2. Each sensor cell 20 is electrically wired to the calculation circuit.

Figure 3:
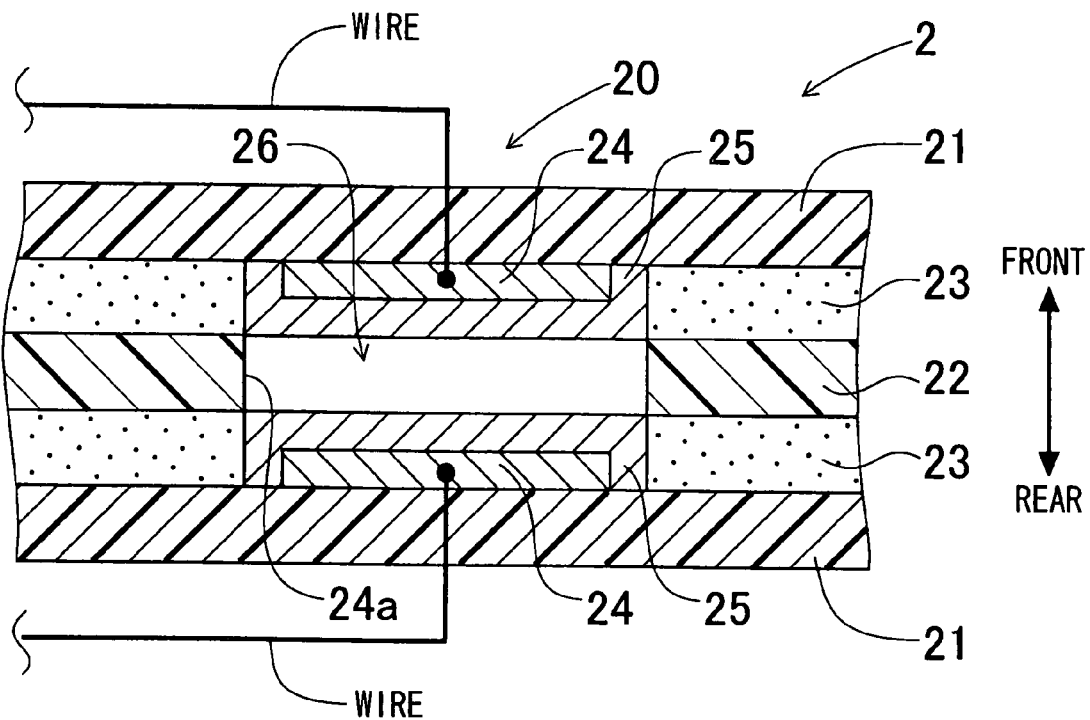
FIG. 3 is a cross-sectional view of a pressure sensor of the collision detection system of FIG. 1.

The pressure sensor 2 is constructed as shown in FIG. 3. A spacer film 22 is sandwiched between a pair of resin films 21 through adhesive films 23. The resin films 21 and the spacer film 22 can be made of various types of resin like a polyethylene naphthalate (PEN) or polyethylene terephthalate (PET). A stacked film of the spacer film 22 and the adhesive films 23 has a plurality of circular openings 24*a*. The openings 24*a* are separated from each other by a predetermined distance and arranged in a line along the length of the pressure sensor 2. Each sensor cell 20 is formed in a corresponding one of the openings 24*a*.

Figure 4:
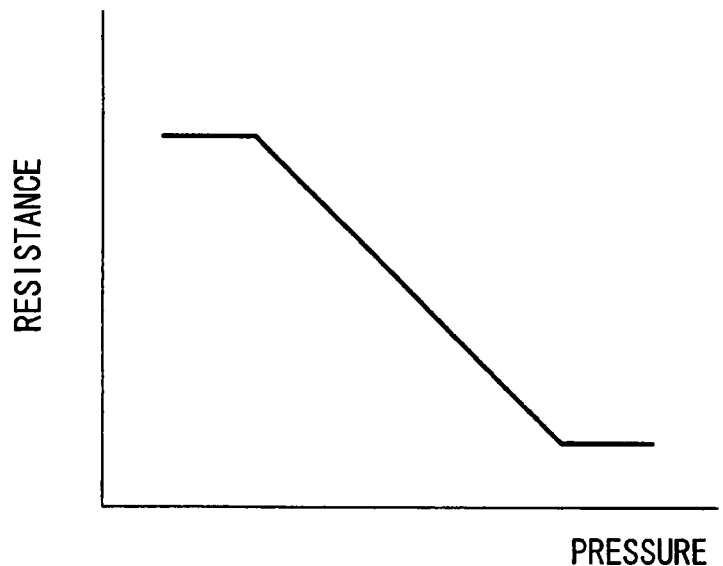
FIG. 4 is a graph showing a relationship between a resistance of a pressure-sensitive film of the pressure sensor of FIG. 3 and pressure applied to the pressure-sensitive film.

Each sensor cell 20 includes a pair of conductive ink films 24 and a pair of pressure-sensitive ink films 25. The conductive ink films 24 are formed on inner surfaces of the resin films 21, respectively. The conductive ink films 24 are connected to the control circuit by conductive wires. The pressure-sensitive ink films 25 are formed on the inner surfaces of the resin films 21 to cover the conductive ink films 24, respectively. As shown in FIG. 4, there is a linear correlation between a resistance of the pressure sensitive ink films 25 and pressure applied to the pressure sensitive ink films 25. Specifically, the resistance of the pressure sensitive ink films 25 decreases with an increase in pressure applied thereto. A gap 26 is provided between the pressure sensitive ink films 25. A gap width GW of the gap 26 is defined by a thickness of the spacer film 22.

As shown in FIG. 1, the load plate 3 is placed in front of the pressure sensor 2 and extends along the bumper reinforcement 1. As shown in detail in FIG. 5A, the load plate 3 has a base 30 and a plurality of legs 31 integrally formed with the base 30. The base 30 extends along the bumper reinforcement 1. The legs 31 are arranged in two lines in the length direction of the load plate 3. The legs 31 project from the base 30 towards the bumper reinforcement 1 and have direct contact with the bumper reinforcement 1. In short, as shown in FIG. 5B, the legs 31 have no contact with the pressure sensor 2. Alternatively, the legs 31 may have indirect contact with the bumper reinforcement 1 through the stacked film of the pressure sensor 2. In other words, the legs 31 may have indirect contact with the bumper reinforcement 1 through portions of the pressure sensor 2 except for the sensor cells 20.

As shown in FIG. 5B, each sensor cell 20 of the pressure sensor 2 is positioned in an area enclosed adjacent four legs 31. Each leg 31 has a length that provides a clearance between the base 30 and the pressure sensor 2. Alternatively, each leg 31 may have a length that provides no clearance between the base 30 and the pressure sensor 2.

As shown in FIG. 1, the bumper absorber 4 is placed in front of the load plate 3. The bumper absorber 4 has elasticity and may be, for example, made of resin foam. The bumper absorber 4 reduces impact applied on a bumper in the event of a collision with an object.

The bumper cover 5 covers the bumper reinforcement 1 and the bumper absorber 4 to form an outer appearance of the bumper.

The calculation circuit is electrically wired to the sensor cells 20 of the pressure sensor 2 and receives pressure signals from the sensor cells 20. Further, the calculation circuit receives a speed signal from a speed sensor (not shown) of the vehicle. Based on the signals, the calculation circuit determines what collides with the bumper of the vehicle. The calculation circuit may be, for example, included in an electronic control unit (ECU) of the vehicle.

The collision detection system operates as follows: When the object collides with the bumper of the vehicle, the load plate 3 is pushed toward the pressure sensor 2 by the object through the bumper cover 5 and the bumper absorber 4. As a result, the base 30 of the load plate 3 warps (i.e., deforms) toward the pressure sensor 2 and applies pressure to the sensor cells 20 of the pressure sensor 2. Each sensor cell 20 outputs the pressure signal indicative of the pressure applied thereto.

The calculation circuit receives the pressure signal from each sensor cell 20 and receives the speed signal from the speed sensor. The calculation circuit evaluates the integral of the pressure applied to each sensor cell 20. Then, the calculation circuit calculates the total impact force applied to the bumper by adding up the integrals of the pressures applied to all the sensor cells 20. Then, the calculation circuit calculates the mass of the collided object by dividing the total impact force by the vehicle speed. Then, the calculation circuit determines what collides with the bumper based on the calculated mass. When the calculation circuit determines that the collided object is a human being (i.e., a pedestrian), a pedestrian protection device (e.g., an over-the-hood airbag) is activated.

According to the first embodiment, the load plate 3 has the base 30 and the legs 31 integrally formed with the base 30. The base 30 possess higher stiffness at portions where the legs 31 are formed, so that the magnitude of the warpage of the base 30 is reduced. The pressure applied through the load plate 3 to the pressure sensor 2 is reduced accordingly. For example, when the object collides with the bumper, the load plate 3 receives pressure of about between 100 and 5500 kilopascals (KPa) from the bumper absorber 4. The pressure of about between 100 and 5500 kilopascals (KPa) is reduced to about between 5 and 200 KPa by the load plate 3 and then applied to the pressure sensor 2. Therefore, a cheap pressure sensor having a small pressure-sensitive range can be used as the pressure sensor 2 so that the collision detection system can be manufactured at low cost.

Second Embodiment

Figure 6:
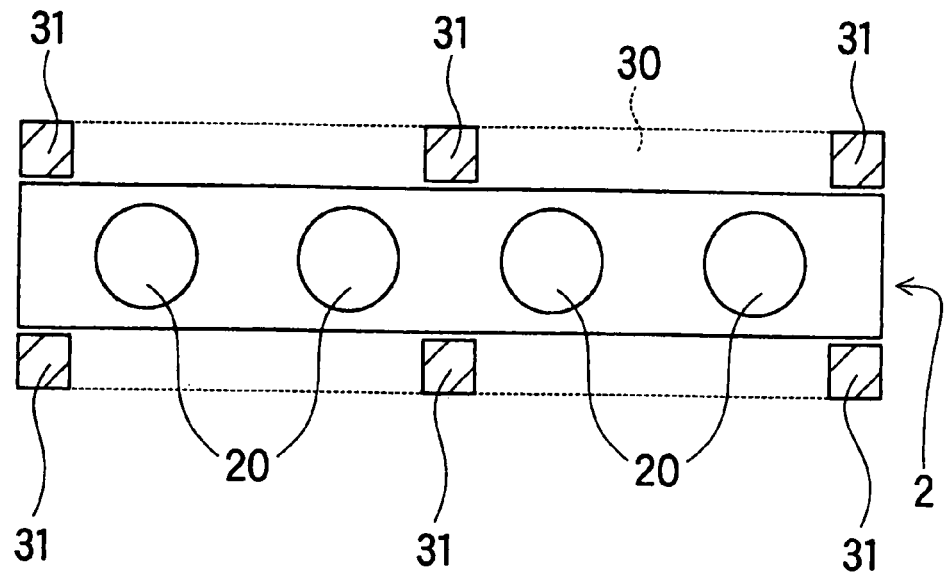
FIG. 6 is a cross-sectional view showing a positional relationship between a pressure sensor and a load plate of a collision detection system according to a second embodiment of the present invention.

In a second embodiment shown in FIG. 6, two sensor cells 20 of the pressure sensor 2 are positioned in an area enclosed adjacent four legs 31. Therefore, as compared to the first embodiment, the number of the legs 31 arranged in the length direction of the load plate 3 is reduced so that the distance between adjacent legs 31 arranged in the length direction of the load plate 3 is increased. In such an approach, as compared to the first embodiment, the magnitude of the warpage of the base 30 is slightly larger so that the pressure applied to the pressure sensor 2 is slightly larger.

Third Embodiment

Figure 7:
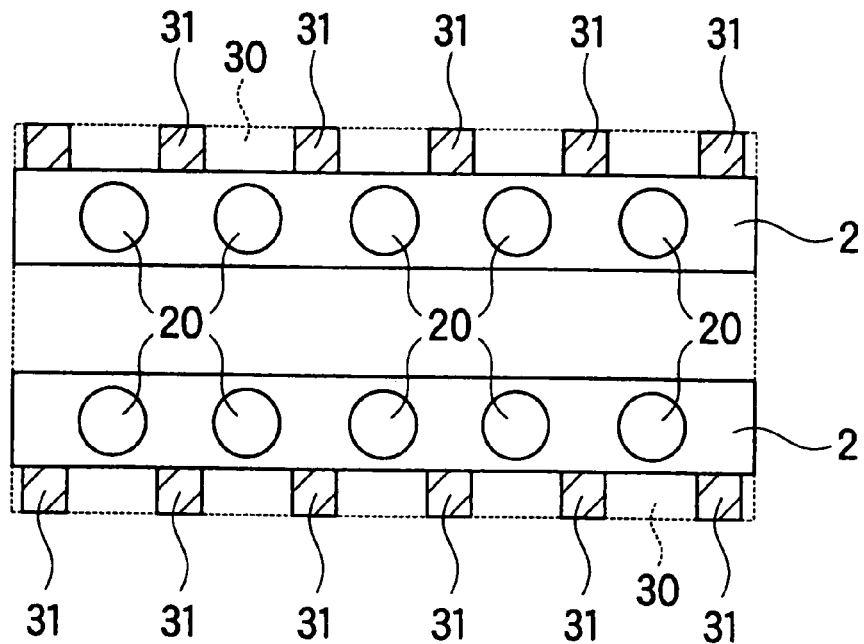
FIG. 7 is a cross-sectional view showing a positional relationship between a pressure sensor and a load plate of a collision detection system according to a third embodiment of the present invention.

In the first embodiment, each of the two pressure sensors 2 is provided with a separate load plate 3. In contrast, in a third embodiment shown in FIG. 7, two pressure sensors 2 share a single load plate 3. One sensor cell 20 of each pressure sensor 2 is positioned in an area enclosed adjacent four legs 31 of the load plate 3. Therefore, as compared to the first embodiment, the distance between adjacent legs 31 arranged in the width direction of the load plate 3 is increased. In such an approach, as compared to the first embodiment, the magnitude of the warpage of the base 30 is slightly larger so that the pressure applied to the pressure sensor 2 is slightly larger.

Fourth Embodiment

In the first embodiment, as shown in FIGS. 5A, 5B, the sensor cells 20 of the pressure sensor 2 are evenly arranged in the side-to-side direction of the vehicle. Accordingly, the legs 31 of the load plate 3 are evenly arranged in the side-to-side direction of the vehicle.

In the case of FIG. 1, since the bumper reinforcement 1 is supported at two portions by the front side member (Fm), the bumper reinforcement 1 possess high strength at the supported portions. When the collision occurs, and impact force is applied to the bumper, deformation of the bumper reinforcement 1 becomes larger with distance from the supported portions. Therefore, the impact force escapes easily with distance from the supported portions. As a result, output signal levels of the sensor cells 20 positioned away from the supported portions may be less than output signal levels of the sensor cells 20 positioned near the supported portions. In short, the sensor cells 20 may exhibit different pressure sensitivity in the side-to-side direction of the vehicle, for example, due to factors such as a position of the front side member (Fm) relative to the bumper reinforcement 1 and a shape of the bumper reinforcement 1.

Figure 8A:
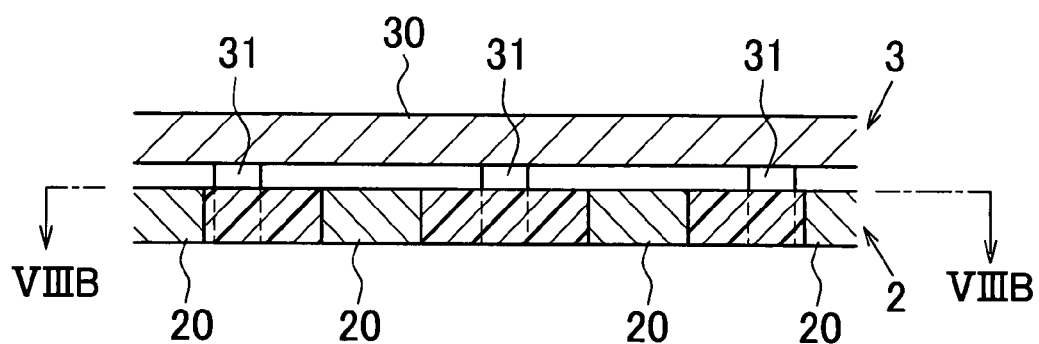
FIG. 8A is a cross-sectional view showing a positional relationship between a pressure sensor and a load plate of a collision detection system according to a fourth embodiment of the present invention.
Figure 8B:
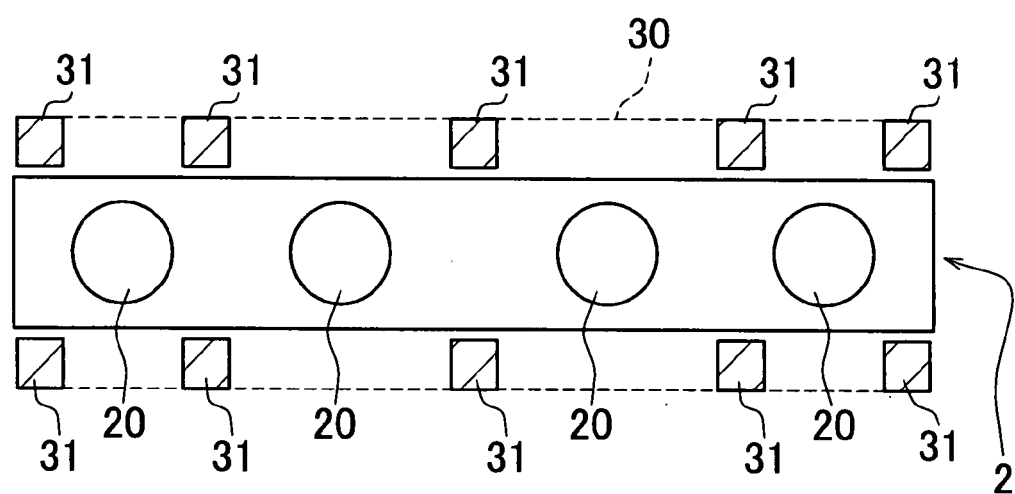
FIG. 8B is a cross sectional view taken along line VIIIB-VIIIB of FIG. 8A.

In contrast, in a fourth embodiment shown in FIGS. 8A and 8B, the sensor cells 20 are unevenly arranged in the side-to-side direction of the vehicle. Accordingly, the legs 31 of the load plate 3 are unevenly arranged in the side-to-side direction of the vehicle. Specifically, the number of the sensor cells 20 arranged away from the supported portions of the bumper reinforcement 1 is set greater than the number of the sensor cells 20 arranged near the supported portions of the bumper reinforcement 1. Accordingly, the number of the legs 31 arranged away from the supported portions of the bumper reinforcement 1 is set greater than the number of the legs 31 arranged near the supported portions of the bumper reinforcement 1. In such an approach, the pressure sensitivity of the sensor cells 20 can be equalized in the side-to-side direction of the vehicle.

Modifications

The embodiments described above may be modified in various ways. For example, the base 30 and the legs 31 may be separate pieces. The pressure sensor 2 and the load plate 3 may be placed in front of the bumper absorber 4. The bumper absorber 4 may be eliminated from the collision detection system. The bumper cover 5 may be eliminated from the collision detection system. The length of the legs 31, the number of the legs 31, the thickness of the base 30, or materials of the base 30 and the legs 31 may vary so that the magnitude of the warpage of the base 30 can be suitably adjusted.

The collision detection system may include only one pressure sensor 2 or more than three pressure sensors 2. The calculation circuit may use a different way to determine that the collided object is a pedestrian. For example, the calculation circuit may use sensors other than the speed sensor to determine that the collided object is the pedestrian. When the collision with the pedestrian is detected, an occupant protection device (e.g., an airbag and seatbelt pretensioner) may be activated in addition to the pedestrian protection device. The collision detection system may detect a collision with other object such as another vehicle, a wall, or the like. In this case, when the collision is detected, the occupant protection device may be activated instead of the pedestrian protection device.

Such changes and modifications are to be understood as being within the scope of the present invention as defined by the appended claims.

What is claimed is:

1. A collision detection system for a vehicle comprising:
 a bumper reinforcement that is fixed to a side member of the vehicle;
 a pressure sensor that is placed in front of the bumper reinforcement and has at least one pressure-sensitive member responsive to pressure, wherein the at least one pressure-sensitive member comprises a plurality of pressure-sensitive members arranged in a side-to-side direction of the vehicle; and
 a load plate that is placed in front of the pressure sensor;
 wherein the load plate has a base member and at least one leg member extending from the base member toward the bumper reinforcement, wherein each leg member is located between adjacent pressure-sensitive members and is not in contact with the pressure-sensitive members of the pressure sensor,
 wherein the base member has a first portion facing the pressure-sensitive members of the pressure sensor and is spaced by the leg member from the pressure-sensitive members of the pressure sensor in a front-rear direction of the vehicle, and a second portion fixed to the leg member,
 wherein the leg member comprises a plurality of leg members,
 wherein a first at least one of the plurality of leg members is located above the pressure sensor in an up-down direction of the vehicle, and
 wherein a second at least one of the plurality of leg members is located below the pressure sensor in the up-down direction.

2. The collision detection system according to claim 1, wherein the pressure-sensitive members are unevenly arranged in the side-to-side direction of the vehicle.

3. The collision detection system according to claim 1, wherein the pressure sensor is a mat-type pressure-sensitive sensor.

* * * * *